United States Patent
Tsai

(10) Patent No.: US 11,673,538 B2
(45) Date of Patent: Jun. 13, 2023

(54) METHOD OF OPERATING ANTI-LOCK BRAKING SYSTEM OF BICYCLE

(71) Applicant: JOY INDUSTRIAL (SHENZHEN) CO., LTD., Bao An Shen Zhen (CN)

(72) Inventor: Chien-Yuan Tsai, Bao An Shen Zhen (CN)

(73) Assignee: Joy Industrial (Shenzhen) Co., Ltd., Bao An Shen Zhen (CN)

( * ) Notice: Subject to any disclaimer, the term of this patent is extended or adjusted under 35 U.S.C. 154(b) by 0 days.

(21) Appl. No.: 17/491,779

(22) Filed: Oct. 1, 2021

(65) Prior Publication Data

US 2023/0105137 A1 Apr. 6, 2023

(51) Int. Cl.
*B60T 8/32* (2006.01)
*B62L 3/00* (2006.01)
*B60T 8/17* (2006.01)

(52) U.S. Cl.
CPC .......... *B60T 8/3225* (2013.01); *B60T 8/1706* (2013.01); *B62L 3/00* (2013.01); *B60T 2270/10* (2013.01)

(58) Field of Classification Search
None
See application file for complete search history.

(56) References Cited

U.S. PATENT DOCUMENTS

2016/0318575 A1\* 11/2016 Shimoda ................. B62M 6/55
2019/0225298 A1\* 7/2019 Takahashi ............ B62J 45/4151

FOREIGN PATENT DOCUMENTS

| CN | 107512258 A | * | 12/2017 | |
| DE | 102012222058 A1 | * | 6/2014 | ............ B60T 8/3225 |
| DE | 102015219904 A1 | * | 4/2017 | ................ B60L 3/08 |
| DE | 102021105908 A1 | * | 9/2021 | .............. B60T 7/085 |

\* cited by examiner

*Primary Examiner* — Melanie Torres Williams
(74) *Attorney, Agent, or Firm* — Rosenberg, Klein & Lee

(57) ABSTRACT

A method of operating an anti-lock braking system (ABS) of a bicycle comprising steps of: judging whether a power of a battery meets a set value; judging a moved angular position of a brake lever; outputting electric currents to operate the ABS; and judging whether a running speed of the bicycle is zero. When the power meets the set value, the ABS is turned on, and when the power of the battery is low, the ABS is not turned on. After the brake lever is pressed, the control unit judges whether the moved angular position of the brake lever reaches a set position. When the moved angular position does not reach the set position, the ABS is not turned on. When the moved angular angle reaches the set position, the ABS is turned on. The control unit outputs the electric currents to turn on the ABS, thus braking the bicycle.

4 Claims, 1 Drawing Sheet

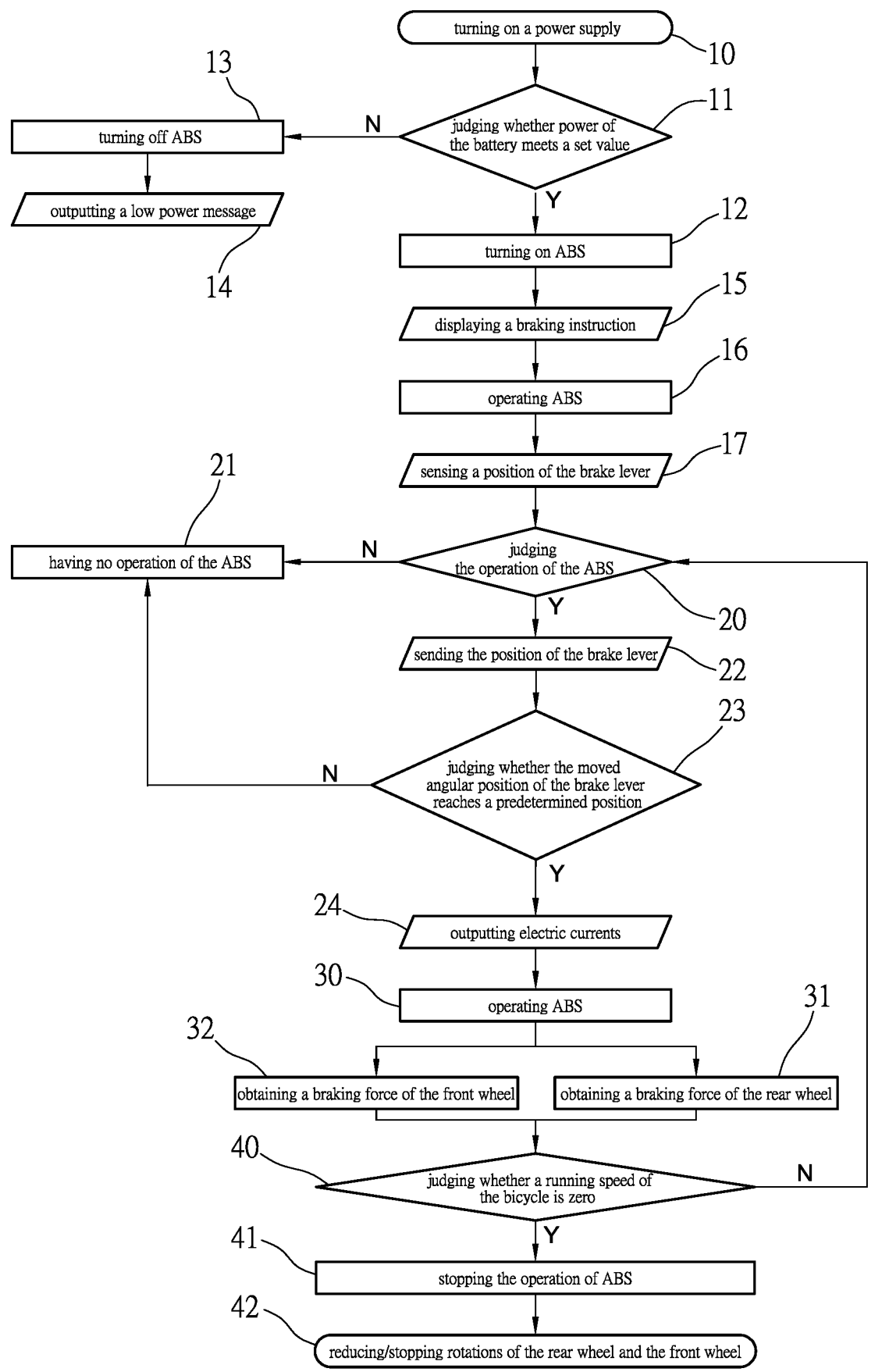

METHOD OF OPERATING ANTI-LOCK BRAKING SYSTEM OF BICYCLE

FIELD OF THE INVENTION

The present invention relates to a method of operating an anti-lock braking system (ABS) of a bicycle which is configured to turn on the ABS and to judge whether the electric currents drive the ABS to operate exactly and effectively.

BACKGROUND OF THE INVENTION

A conventional anti-lock braking system (ABS) of a bicycle contains an acceleration sensor, and an anti-lock braking module is fixed on each of a front wheel and a rear wheel, such that angular velocity signals of the front wheel and the rear wheel are calculated to acquire a running speed of the bicycle, angular decelerations and slipping rate of the front wheel and the rear wheel. When the front wheel and the rear wheel are locked to reduce engagement force, the angular decelerations and the slipping rate maintained within a range so as to recover engagement force after accelerating the running speed of the front wheel and the rear wheel.

A conventional anti-lock braking system (ABS) of a bicycle and method of operating the same are disclosed in TW 1663093, and the system contains a calculation unit configured to judge whether a brake of the bicycle is turned on by a rider. When the brake is turned on by the rider, a first sensor senses a running speed of two wheel of the bicycle, wherein the calculation unit based on the running speed of the two wheels and a first set value to judge whether a braking of the two wheel is executed, the braking steps includes acquiring decrease speed of the bicycle and judging the braking. Thereafter, the calculation unit judges whether the brake is released by the rider. When the brake is not released by the rider, the calculation unit judges whether executing the braking again according to the running speed of the two wheels and a second set value.

However, when the running speed reduces, it is not in a braking sate, such as reducing the running speed merely, thus having inexact judgment of the braking.

The present invention has arisen to mitigate and/or obviate the afore-described disadvantages.

SUMMARY OF THE INVENTION

The primary aspect of the present invention is to provide a method of operating an anti-lock braking system (ABS) of a bicycle which is configured to turn on the ABS and to judge a moved angular position of a brake lever of a handle and whether the electric currents drive the ABS to operate exactly and effectively.

To obtain above-mentioned aspect, a method of operating an anti-lock braking system (ABS) of a bicycle provided by the present invention contains steps of:

using a control unit to judge whether a power of a battery meets a set value, wherein the control unit is electrically connected with the battery, when the power of the battery meets the set value, the ABS mounted on the bicycle is turned on automatically, and when the power of the battery is low, the ABS is not turned on;

judging a moved angular position of a brake lever by way of the control unit, wherein after the brake lever below a handle is pressed to brake the bicycle, the control unit judges whether the moved angular position of the brake lever reaches a set position, when the moved angular position of the brake lever does not reach the set position, the ABS is not turned on; when the moved angular angle reaches the set position, the ABS is turned on;

outputting electric currents to operate the ABS by using the control unit, wherein the control unit outputs the electric currents automatically to turn on the ABS to brake the bicycle; and judging whether a running speed of the bicycle is zero by way of the control unit, wherein when the running speed of the bicycle is zero, the control unit sends a brake releasing instruction to the ABS so as to eliminate a barking of the bicycle, thus stopping operation of the ABS.

Thereby, the control unit controls electric currents to turn on the ABS and to sense a moved angular position of the brake lever, thus judging whether the ABS operates to brake the bicycle. For example, when the power reaches the set value, the ABS is turned on to brake the bicycle. When the power does not reach the set value, the ABS is turned off. However, the rider brakes the bicycle mechanically, for example, the bicycle is braked by pressing a V-shaped or U-shaped caliper or starting a disc brake to stop a rim of a wheel, thus braking the bicycle when the power of the battery is low safely.

When the moved angular position of the brake lever reaches a set position, the at least one angular sensor sends massage back to the control unit so that the control unit sends an operation signal and outputs electric currents to the ABS, thus operating the ABS exactly.

Each of the front wheel and the rear wheel has the ABS so that the control unit outputs the electric currents to the ABS, and the braking forces of the rear wheel and the front wheel are automatically distributed to the ABS according to braking force ratios of the rear wheel and the front wheel after the ABS is turned on by the electric currents, thus stopping the bicycle accurately.

BRIEF DESCRIPTION OF THE DRAWINGS

The FIGURE is a flow chart of a method of operating an anti-lock braking system (ABS) of a bicycle according to a preferred embodiment of the present invention.

DETAILED DESCRIPTION OF THE PREFERRED EMBODIMENTS

With reference to the FIGURE, a method of operating an anti-lock braking system (ABS) of a bicycle according to a preferred embodiment of the present invention, the anti-lock braking system comprises: a control unit fixed on the bicycle, electrically connected with a battery of a supply power, and configured to monitor power of the battery, wherein the battery of the control unit is electrically connected with and is configured to control the anti-lock braking system of the bicycle (as shown in FIG. 1), and the control unit is electrically connected with a displayer and at least one angular sensor, wherein the displayer is configured to display signal light data, and the at least one angular sensor is mounted on a brake lever. The control unit further includes a microcontroller (MCU) configured to automatically distribute electric currents to the anti-lock braking system. Thereby, the method of operating the anti-lock braking system comprises steps of:

10) turning on a power supply by using the control unit, wherein the anti-lock braking system is started or not started by the power of the battery controlled by the control unit;

11) judging whether the power of the battery meets a set value, wherein the control unit monitors a power capacity of the battery so as to judge whether the power capacity reaches the set value, and the set value is at least more than 10% of the power capacity;

12) turning on the anti-lock braking system (ABS), wherein when the control unit judges the power of the battery reaches the set value, the ABS is turned on by the control unit automatically;

13) turning off the anti-lock braking system (ABS), wherein when the power of the battery does not reach the set value, the ABS is automatically turned off by the control unit;

14) outputting a low power message, wherein when the power of the battery is low, the anti-lock braking system is not turned on, and the control unit outputs the low power message via the displayer by making sounds or emitting lights to remind a rider so that the rider charges the battery to reach the set value; wherein when the power of the battery is low, the bicycle is braked mechanically, for example, the bicycle is braked by pressing a V-shaped or U-shaped caliper or starting a disc brake to stop a rim of a wheel, thus braking the bicycle when the power of the battery is low;

15) displaying a braking signal, wherein after the brake lever below a handle is pressed by the rider, the displayer of the control unit displays a braking signal, and the brake lever has the at least one angular sensor mounted thereon;

16) having ABS operation, wherein the control unit controls the ABS to operate after the rider presses the brake lever;

17) sensing a position of the brake lever, wherein the at least one angular sensor senses a braking operation of the ABS after the brake lever is pressed by the rider to brake the bicycle;

20) judging the operation of the ABS, wherein the control unit monitors the operation of the ABS by way of the at least one angular sensor after the rider presses the brake lever to sense a moved angular position of the brake lever, such that the control units judges whether the ABS enters a braking process;

21) having no operation of the ABS, wherein when the moved angular position of the brake lever is small after being sensed by the at least one angular sensor of the control unit, the control unit does not send a braking instruction to the ABS;

22) sending the moved angular position of the brake lever back to the control unit, wherein the control unit judges the moved angular position of the brake lever after sending the moved angular position of the brake lever sensed by the at least one angular sensor back to the control unit;

23) judging whether the moved angular position of the brake lever reaches a predetermined position, wherein the control unit judges whether the moved angular position of the brake lever reaches the predetermined position where the ABS is locked, and when the moved angular position of the brake lever does not reach the predetermined position, the ABS does not operate and moves back to the step 21);

24) outputting electric currents, wherein the MCU of the control unit calculates a pulse width modulation (PWM) automatically based on climbing forces of a front wheel and a rear wheel of the bicycle, when the moved angular position of the brake lever reaches the predetermined position, an output proportion of the electric currents is controlled, for example, when a climbing force of the rear wheel is more than a climbing force of the front wheel, an output proportion of the electric currents of the rear wheel is more than an output proportion of the electric currents of the front wheel;

30) operating ABS, wherein the MCU of the control unit sends the braking instruction in the step 24) so that the ABS operates;

31) obtaining a braking force of the rear wheel and 32) obtaining a braking force of the front wheel, wherein the braking forces of the rear wheel and the front wheel are automatically distributed to the ABS according to braking force ratios of the rear wheel and the front wheel after the ABS is turned on by the electric currents, for example, a braking force ratio of the rear wheel is within 50% to 70%, and a braking force ratio of the front wheel is 30% to 50%;

40) judging whether a running speed of the bicycle is zero, wherein the control unit monitors whether the running speed of the bicycle is zero after the ABS brakes the rear wheel and the front wheel, and when the running speed of the bicycle is zero, it represents that a reduced speed of the bicycle is more than a predetermined reducing speed, hence the control unit sends a brake releasing instruction to the ABS so as to eliminate a barking of the bicycle, thus stopping operation of the ABS; when the running speed of the bicycle is not zero, the step 20) is executed once more so that the at least one angular sensor of the control unit monitors the operation of the ABS after the rider presses the brake lever to sense the moved angular position of the brake lever, and the control units judges whether sends the braking instruction to the ABS;

41) stopping the operation of ABS, wherein the running speed of the bicycle reaches a safe value after being monitored the running speed of the bicycle is zero by the control unit, such that the control unit sends the brake releasing instruction to the ABS so as to stop the operation, thus ending the operation of the ABS; and 42) reducing/stopping rotations of the rear wheel and the front wheel, wherein the rider reduces the rotations of the rear wheel and the front wheel by stepping slowly or stopping stepping the rear wheel and the front wheel after stopping the operation of ABS, thus riding the bicycle slowly, stopping the bicycle or moving the bicycle to a parking zone.

While the preferred embodiments of the invention have been set forth for purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A method of operating an anti-lock braking system (ABS) of a bicycle comprising steps of:

using a control unit to judge whether a power of a battery meets a set value, wherein the control unit is electrically connected with the battery, when the power of the battery meets the set value, the ABS mounted on the bicycle is turned on automatically, and when the power of the battery is low, the ABS is not turned on;

judging a moved angular position of a brake lever by way of the control unit, wherein after the brake lever below a handle is pressed to brake the bicycle, the control unit judges whether the moved angular position of the brake lever reaches a set position, when the moved angular position of the brake lever does not reach the set position, the ABS is not turned on; when the moved angular angle reaches the set position, the ABS is turned on;

outputting electric currents to operate the ABS by using the control unit, wherein the control unit outputs the electric currents automatically to turn on the ABS to brake the bicycle; and judging whether a running speed of the bicycle is zero by way of the control unit, wherein when the running speed of the bicycle is zero, the control unit sends a brake releasing instruction to the ABS so as to eliminate a braking of the bicycle, thus stopping operation of the ABS, wherein the control unit includes a microcontroller (MCU) configured to calculate a pulse width modulation (PWM) automatically based on climbing forces of a front wheel and a rear wheel of the bicycle, to control an output proportion of the electric currents, wherein when a climbing force of the rear wheel is more than a climbing force of the front wheel, an output proportion of the electric currents of the rear wheel is more than an output proportion of the electric currents of the front wheel.

2. The method as claimed in claim 1, wherein the control unit is fixed on the bicycle and is configured to monitor the power of the battery, and the control unit is electrically connected with and is configured to control the anti-lock braking system to operate or to stop, wherein the control unit is electrically connected with a displayer and at least one angular sensor, wherein the displayer is configured to display signal light data, and the at least one angular sensor is mounted on the brake lever.

3. The method as claimed in claim 1, wherein the control unit monitors a power capacity of the battery so as to judge whether the power capacity reaches the set value, and the set value is at least more than 10% of the power capacity.

4. The method as claimed in claim 1, wherein when the power of the battery does not reach the set value, the control unit turns off the ABS is automatically.

* * * * *